Aug. 18, 1970
R. T. DAWES
3,524,792
ELASTICALLY-STRETCHABLE, LEATHER-LIKE MATERIAL
AND METHOD OF MAKING THE SAME
Original Filed April 1, 1963
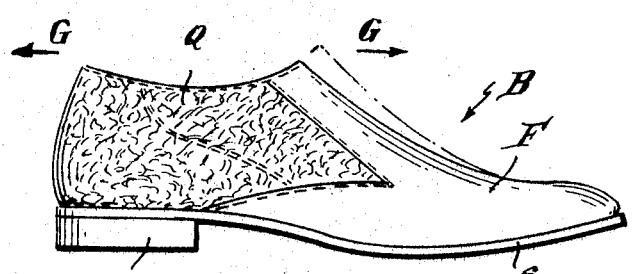
Fig. 1
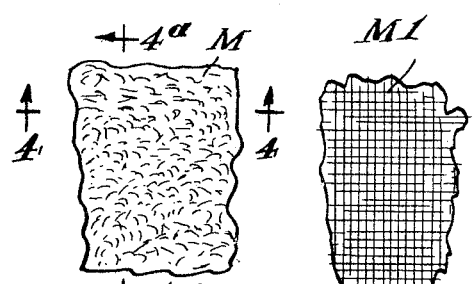
Fig. 2   Fig. 3
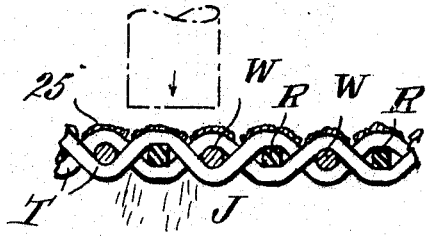
Fig. 4
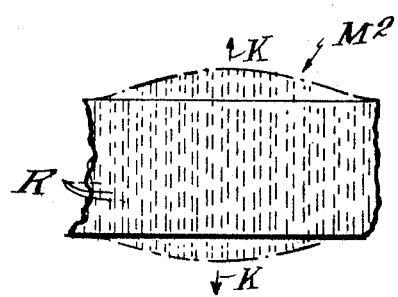
Fig. 5
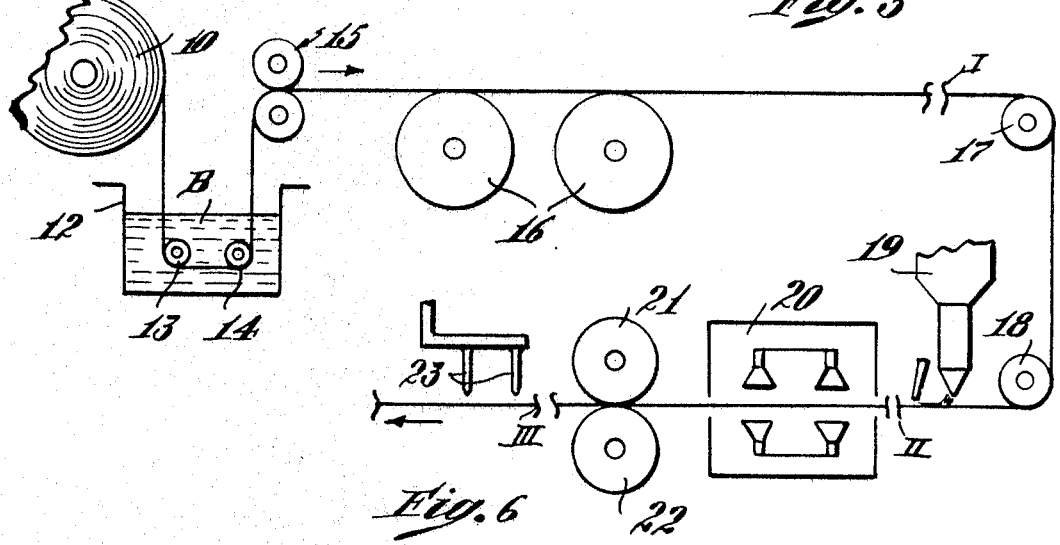
Fig. 6
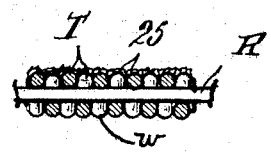
Fig. 4ª
INVENTOR.
ROBERT T. DAWES
BY
ATT'YS

United States Patent Office 3,524,792
Patented Aug. 18, 1970

3,524,792
ELASTICALLY-STRETCHABLE, LEATHER-LIKE MATERIAL AND METHOD OF MAKING THE SAME
Robert T. Dawes, c/o Thomas Taylor & Sons, Inc., Hudson, Mass. 01749
Continuation of application Ser. No. 269,488, Apr. 1, 1963. This application Nov. 7, 1966, Ser. No. 592,673
Int. Cl. D03d 3/00, 15/00, 17/00
U.S. Cl. 161—77                               5 Claims

ABSTRACT OF THE DISCLOSURE

An elastically-stretchable material of practical utility in the manufacture of shoe uppers, for example, as an inserted gore, and which is pervious to air and moisture similarly to natural leather and has a surface appearance closely simulating leather.

---

This application is a continuation of application Ser. No. 269,488, filed Apr. 1, 1963, and now abandoned.

This invention pertains to elastic material of such character as to be of practical utility as a substitute for leather or leather-like materials in the manufacture of shoe uppers or other articles of apparel, and more particularly to a material which, although elastically-stretchable, has substantially the same surface appearance as leather as well as a degree of permeability to air or moisture comparable to that of natural leather.

For many years it has been customary to incorporate pieces of elastically-stretchable material in the uppers of boots or shoes for the purpose of providing a closer fit or to facilitate the donning and doffing of the shoes. Such "elastic shoe goring," that is, elastic material for insertion in the uppers of shoes, has been used for considerably more than one hundred years, and very widely since the year 1837, when the vulcanization of rubber was invented by Charles Goodyear, thereby making possible the manufacture of rubber thread for combination with textile materials in the manufacture of elastic fabric. However, throughout this entire period, the use of elastic material in shoe uppers has been substantially limited because its appearance, regardless of any surface texture imparted to it, was not closely similar to that of the leathers commonly employed in shoe uppers. Various attempts have been made to solve this problem as, for example, by the use of rubber in sheet form, or by combining sheet rubber with textile materials, such as woven goods cut on the bias or knitted materials, the sheet rubber, in either case, being grained or embossed to look like leather, but when sheet rubber has been employed in this manner and even though it may superficially resemble leather, the sheet rubber prevents the material from "breathing" and thus the footwear, in which such material is incorporated, has the well-recognized undesirable characteristic of a rubber boot. That is to say, a shoe comprising rubber in sheet form causes excessive perspiration and is distinctly uncomfortable to wear, particularly over extended periods. Instead of ordinary sheet rubber, vinyl sheets and other synthetic elastomers have been similarly used but still without solving the problem of providing an elastically-stetchable material which has the "breathing characteristic" moisture permeability essential to produce a comfortable and healthful shoe.

Within the last half century at least, it has been proposed to laminate natural leather to elastic textile fabric by the use of cement while the elastic material was under tension so that, when the cement has set and the laminated material allowed to contract, the leather on the surface of the elastic fabric is caused to crinkle. This produces a very distinctive appearance which could not be satisfactorily matched to the conventional materials commonly used in a shoe upper. This laminated material, while stretchable, does not provide the requisite permeability and such material, after extended use, tends to delaminate because of the difference in the basic elongation of the two materials which have been associated. Another attempt at making an elastic material useful for shoe uppers has involved the application of an adhesive coating to an elastically-stretchable textile fabric, while under tension, and then dusting the adhesive coating with cut fibers thus producing a suede-like or velvet-like stretchable material. Such materials, while useful for certain types of footwear, have defects similar to that of the above-described laminated material for, if the adhesive coating, such as rubber cement or latex, is properly applied, it substantially reduces the permeability of the basic textile material and, in use, the deterioration of the cement or abrasion causes loss of the flock so that the initial appearance, although perhaps satisfactory, is soon lost. It has also previously been suggested to impart a leather-like surface appearance to elastically-stretchable textile materials by embossing its surface by the application of heat and pressure, but the surface appearances which thus may be produced are very limited and usually disappear quickly in response to the continual flexing or abrasion to which the material is subjected during the use of the shoe.

The present invention has for an object the provision of an elastically-stretchable material which is not only elastically-stretchable to the desired degree for use as a part of or in fact as an entire shoe upper, but which is permeable to air and moisture; which may have an appearance substantially indistinguishable from that of natural leather; and which retains its initial appearance, when employed as an element of a shoe upper, for a period of use approximating that of natural leather. A further object is to provide a novel method of producing material having the above characteristics.

Briefly stated, the present invention involves the employment of a textile fabric, for example, but without limitation, a broken-twill, woven fabric having incorporated therein elastically-stretchable threads of rubber or its equivalent—the rubber threads usually, but not necessarily, extending in the warpwise direction, and then (desirably, as it comes from the loom, without subjecting the material to customary finishing steps) it is impregnated with a material, preferably in the form of a latex, for example, an acrylic latex, having combined therewith a suitable pigment and casein, and with water in sufficient proportion to dilute it to a viscosity such as will allow complete impregnation of the yarns of the base fabric when the material is passed through the usual type of finishing machine. Optionally, after drying, one or both sides may be coated with the same material or a material of the same general character as the impregnant and then, after drying, subjecting it to embossing pressure, either in a conventional plate press or by means of rolls, heated sufficiently to soften and reform the material which has been impregnated into or deposited upon the base fabric. As an optional step, the embossed surface may then be sprayed with a finishing material of any of the types customarily employed for imparting a finished or polished appearance to usual upper leather. The term "rubber-elastic" thread as here used, is to be construed, as above noted, to include equivalents of natural rubber, as respects elasticity.

Other and further objects and advantages of the invention will be pointed out in the following more detailed description and by reference to the accompanying drawings wherein:

FIG. 1 is a side elevation of a shoe wherein the entire quarter portion consists of material having the characteristics of that hereinabove referred to;

FIG. 2 is a plan view showing a small piece of the material before its incorporation in the shoe upper and indicating diagrammatically a surface grain appearance such as may be imparted by embossing;

FIG. 3 is a view similar to FIG. 2 but showing the back side of the fabric;

FIG. 4 is a section of the line 4—4 of FIG. 2, to much larger scale, illustrating, in general, the construction of the material, and illustrating the fact that air under a few ounces pressure will pass through the material, as may readily be proven by blowing smoke-laden air through the material;

FIG. 4 is a section on the line 4—4 of FIG. 2, to much 4a—4a of FIG. 2;

FIG. 5 is a plan view showing a piece of the material and indicating the incorporated rubber threads by dotted lines and illustrating how the material may be stretched longitudinally by the application of oppositely directed forces; and FIG. 6 is a diagrammatic elevation illustrating a desirable procedure in the preparation of material in accordance with the present invention.

Referring first to FIG. 6, wherein certain desirable steps in the manufacture of the material of the present invention are diagrammatically illustrated, the numeral 10 indicates a roll of base fabric, that is to say, a textile material having inclusions of rubber thread and which may be a woven fabric, a knitted fabric, a braid or other textile material in which the rubber elastic threads are incorporated either as warps, wefts, or both. Having provided such a base fabric, for specific example, a woven fabric, it is drawn off from a roll or other form of supply and passed down through a vat or tank 12 containing a body B of the impregnating material, the fabric passing down beneath guide rolls 13 and 14 and then up out of the tank and between squeeze rolls 15, and then passing over drying cans or drums 16, heated, for example, to a temperature of 230° F. As illustrated in FIG. 6, if the fabric is to be coated on one side, the dried impregnated fabric is then conducted about guide rolls 17 and 18 and beneath a container 19 which delivers, for example, by the use of a doctor blade, a uniformly thick film or layer of the coating material on the advancing web, the latter then passing through a preheating chamber 20 where it is subjected to a temperature of approximately 200° F., and then advances into the field of action of embossing means, for example, a pair of rolls 21 and 22, one of which may be engraved to impart the desired surface effect to the coated side of the fabric. The embossing pressure may be, for example, of the order of 960 pounds per square inch. If desired, the material may then be advanced directly into the field of action of a spraying device shown as comprising nozzles 23 designed to spray the coated and embossed face of the fabric with any suitable finishing material, such, for example, as to give the material a polish or to enable it to receive a polish when subjected to suitable polishing brushes or the like. While as diagrammatically illustrated in FIG. 6, the operation is shown as continuous, it will be understood that it may be carried out as a succession of separate steps, some of which may be omitted, as suggested for example by the breaks indicated at I, II, III in FIG. 6.

Referring to FIG. 1 of the drawings, the character B indicates, more-or-less diagrammatically, a shoe of generally customary construction comprising the sole S, the heel H, the forepart portion F and the quarter Q—the forepart portion F being of ordinary upper leather, while the quarter portion Q is of material having the characteristics of that of the present invention. As shown in broken lines in FIG. 1, because of the elastically-stretchable character of the material forming the quarter Q, and in which it may be assumed that the rubber elastic threads extend generally in a front-to-rear direction, it is possible, by applying force as indicated by the arrows G, to stretch the upper of the shoe so as to increase the size of the opening at the top of the shoe, thus facilitating donning or doffing of the shoe. While the invention is here illustrated as embodied in but one type of shoe, it will be understood that it is not thus limited, but that it may be embodied in other types of shoe, for instance the so-called "Congress" shoe, or in other types of footwear, for instance slippers, or overshoes.

A piece M of the material of the present invention is shown in FIG. 2 to illustrate a surface appearance which may be imparted by embossing and which, for example, is such as to simulate the grain effect of the leather used in the forepart portion of the shoe. However, if desired, the surface of the material used in the quarter may be of a contrasting character as respects that of the forepatr portion, either, for instance, in character of grain or in color.

In FIG. 3 the rear side of the piece of material M is indicated at M1 and in this case, since the material was not coated or embossed on this side, it exhibits the characteristic weave structure of the original basic textile fabric.

In FIG. 4 the material is shown in transverse section, to larger scale. This material comprises, for example, cotton warp yarns W and rayon weft or filling yarns T, and with rubber-elastic warp threads R interspersed among the cotton warp yarns W. As shown (FIG. 4a), the rubber-elastic yarns are located at the midplane of the fabric so that they are concealed by the textile yarns. With the rubber elastic yarns thus located, the fabric is balanced and has little tendency to curl.

As clearly illustrated in FIGS. 4 and 4a all of the textile yarns T and W are of approximately the same size and the bare, rubber-elastic threads R are of approximately the same size as the textile yarns. This, especially in a broken-twill weave, results in a level-surfaced fabric.

It will be understood that the base fabric, which is preferably woven in a broken twill pattern, will have been impregnated with the selected treating material, as above described, and that the material has had applied thereto a coating 25 (FIG. 4) which may be like or similar to the impregnant material and that this coated side has been embossed to produce the surface effect as shown in FIG. 2.

A piece of the material M2 is shown in diagrammatic outline in FIG. 5, indicating the rubber threads R by dotted lines, and illustrating how, by the application of forces K acting in opposite directions and parallel to the rubber threads R, the fabric may be stretched.

A piece of the completed fabric is shown in FIG. 4 as being subjected to a jet of air under a pressure of a few ounces—it being assumed that the air contains smoke or some chemical substance which reveals itself when discharged into the air—and illustrating how the air being directed against one surface of the fabric passes through the permeable material, its passage through being made evident by the smoke J appearing at the opposite surface of the fabric.

The material employed for impregnating the basic elastically-stretchable textile comprises basically a thermoplastic substance not necessarily elastomeric, but preferably, as above suggested, in the form of a latex, that is to say, the constituent solids are suspended or dissolved in an aqueous vehicle, although it is contemplated that liquid plastics, such as some of the plastisols or organosols may be employed. Thus, thermoplastics such as vinyls, polyolefins, alkyds, polystyrenes, butyls, nylons, polyesters, polyethers, polyurethanes, acrylics, etc. may be used. Limited use also may be had with thermosetting resins such as ureas and melamines in suitable vehicles, in latex form. Also, cellulose acetate and cellulose acetate-butyrate and vinyl acetate have limited applications. Likewise, natural starches and other sizes, such as corn-starch, potato-starch or gum arabic are unsatisfactory for the same reason. By way of a suggestion but without limitation, the impregnation of the elastic material with an acrylic latex would be carried out by the employment of the selected latex, having associated therewith a suitable pigment, such as carbon black, titanium-dioxide or the like, together with casein. A suitable impregnant, comprising an acrylic latex, may, for example, be the compound sold by United Finish Company of Corwin Street, Peabody, Mass., under the trade designation "RD–39994." The impregnant is of a viscosity such that it will permeate the individual constituent textile yarns of the base fabric. If, in addition, a coat on one or both sides of the impregnated fabric is required or desired, this may be accomplished after impregnation and after drying of the material, using said impregnant or a similar material for the coating, which is applied either with the aid of a doctor blade; by transference from a roll running in a trough containing the coating material; or by spraying.

The dried, impregnated and/or coated material is then embossed, either, for example, in a plate press, such as is often used for embossing leather, or by passing it between a pair of rolls, one of which is engraved with the design desired for the exposed face of the material. The engraving elements should be heated to a temperature (about 250°F.) when using the acrylic latex above suggested—the temperature required being such as to soften and reform the thermoplastic material which has been applied to the base fabric. Thus the material which receives the impression of the embossing element comprises that body of impregnant which permeates the yarns, so that peeling off of the material which has been embossed is impossible. After embossing, the material is cooled to room temperature and then may be sprayed with a finishing lacquer which may give it a bright or dull appearance as desired. The spray material should be compatible with the material used for impregnation and/or coating and may contain any suitable pigment.

One advantage of this material in shoemaking is that once the shoe has been made, the entire shoe may be sprayed to develop a desirable overall appearance, or it may receive a coating of wax such as is used in shoe factories and, when the shoe is in use, the shoe may be polished by the use of customary shoe polishes.

The material thus produced has a satisfactory similarity to any selected grain of leather and the treatment described does not impair to any harmful extent the permeability of the original base fabric. The reason for this novel characteristic appears to reside in the fact that, during impregnation, the impregnant material employed is absorbed into the individual textile strands so that it does not block the minute interstices between the strands, while the surface coating, adhering to the exposed bights of the yarns, separates to provide pores as the material is flexed. Thus, it is inherently satisfactory for the use in large areas of shoes, as shown for example in FIG. 1. In fact, it is quite conceivable that the complete upper of the shoe may be satisfactorily fabricated of such material by using it in the same manner in which leather or other materials are cut, stitched and fabricated into a shoe with stiffening elements, such as box toes, counters, shanks, soles and heels. Such a shoe need not be, nor should it be, lined where restriction of the elongation is undesirable. Obviously, smaller parts of the shoe upper, for example side or front gores, are acceptably made from the material here disclosed.

EXAMPLE I

The base fabric is a woven one-way stretch elastic web woven according to a broken pattern known as 10 time; 7 by 3, wherein the warps are conventionally spun cotton yarns with bare rubber threads interspersed between the cotton warps according to any desired pattern, the filling yarns being of rayon and the rubber threads being substantially concealed by the textile yarns. The average weight of this base material, per inch of width per yard, calculated for different widths, is approximately 0.0529 pound and its maximum elongation of the order of 110%. The treating liquid, an acrylic latex, comprises the acrylonitrile-butadiene-copolymer. To this base there are added suitable coloring materials, for instance carbon black or other pigments and casein, so that the total solids are 18.75% of the total weight. The viscosity is 23 sec. No. 4 Ford cup. The web described is treated with the impregnant by immersion at room temperature or about 70° F. The time of immersion is of the order of from 5 to 6 seconds. The fabric is slightly tensioned mostly to guide it, but is essentially slack in its passage through the impregnant. The material is dried in the usual manner by passing it over drying cans whose surface temperature is about 230° F. The weight per inch of width per yard after drying is approximately 0.0551 pound.

The impregnated and dried web, if no coating is to be applied, is passed through a preheating chamber, heated to approximately 200° F., at a rate of about ten yards per minute, and then passes directly to the embossing apparatus where it is subjected to a temperature of approximately 270° F. and a pressure of from approximately 900 to 1000 pounds p.s.i. If a coating is to be applied to one or both sides of the fabric, the coating material may be identical with the impregnant and applied, for example, by means of a doctor blade to the surface of the impregnated material after the latter has been dried. The coating may be applied to a thickness such as to add from 2 to 3% additional weight as compared with that of the impregnated web.

After the coating has been applied, the web is passed through the heating chamber and is then delivered to the embossing means devoid of tension except that necessary for guiding.

EXAMPLE II

The base fabric is a woven one-way stretch elastic web wherein the constituent textile yarns are woven in a broken twill design known as 8 time; 5 by 3. Bare rubber threads are interspersed between cotton warps and the filling yarns are also cotton, the rubber threads being substantially concealed by the textile yarns. The weight per inch of width per yard, taking an average of six different widths, is 0.0514 pound per yard and the maximum elongation is of the order of 120%. The treating fluid is a material known as Alto-Resin PA, which is a polyvinyl acetate latex made by Atlas Color & Chemical Company of King Terminal, 60 "K" St., South Boston, Mass. Prior to use, this material is diluted with three parts of water. In the diluted condition it contains 18.3% solids and has a viscosity of 16 sec. in a No. 4 Ford cup measured at room temperature. This material is impregnated into the constituent yarns of the fabric in the same way as set forth in Example I, and the weight per inch of width per yard, after drying, is 0.0539 pound. The material is coated and/or embossed following the same procedure as set forth in Example I, the coating, if used, consisting of the acrylic latex material described in Example I and is applied so that the coated material shows an increase in weight over the uncoated material such as described in Example I.

Obviously, the weight of the material absorbed into the base fabric is the difference between that of the base fabric before impregnation and its weight after drying.

This, in Example I, is the remainder, subtracting 0.0529 from 0.0551, that is, 0.0022 pound for a piece of the material one-yard long and one-inch wide.

Similarily, in Example II, the weight of impregant is the difference between 0.0539 and 0.0514 which is 0.0025 pound.

The average of the two examples is 0.00235 pound.

Either of the materials made according to Examples I or II, after having been impregnated and/or coated or embossed, may then be sprayed in a manner similar to that employed in the shoe factory in providing a final finish for shoes. Thus, they may be sprayed with various types of waxes in liquid form or lacquers. One example of such a lacquer is that made by United Finish Company of Corwin Street, Peabody, Mass., having their designating number "E–38282." This contains carbon black, nitrocellulose, castor oil, xylene, butyl acetate and water. The total solids being 10.95% and the viscosity 25 sec. in the No. 4 Ford cup. Another type of spray would comprise a vinyl chloride, vinyl acetate copolymer plasticized with a monomeric and/or polymeric plasticizer with suitable stabilizers. When treated in this manner the material is receptive to polishing waxes or shoe polish so that the elastic material, incorporated in the shoe upper, can be polished in the same manner as the remainder of the shoe, assuming that the latter is of leather.

Besides simulation of leather, a relatively inexpensive elastic material may be in this manner embossed to have the appearance of a much more expensive material satisfactory for shoes and garments, such as, for instance, a Shantung weave, a gabardine or monk's cloth, thereby enhancing its value and usefulness.

The material referred to above was described primarily on the basis of a lengthwise stretch elastic material but the process may also be applied to a sidewise stretch (filling stretch elastic material or to a two-way stretch, wherein the fabric has elastomeric elements both in the warp and filling and to what is sometimes called an "all way" stretch material, which is generally knitted of elastomeric elements or a braid, which is composed of elastomeric elements in the carriers of the braider. In regard to a braid treated and embossed, a possible end use would be an elastic shoelace of leather-like appearance or such an embossed elastic braid might be compounded by rebraiding three or more strands to make stripping for shoes or for elastic belts for male and female apparel. Obviously, woven braided or even knitted narrow fabrics may be so treated and embossed to form leather or other appearing belts that are stretchable.

The finished elastic material as described in any of the phases above may be made water-repellant by the application of a spray, such as aluminum acetate, wax or by immersion in such a solution with drying at a temperature below the reforming temperature of the thermoplastic material used as an impregnant and/or coating.

Briefly reviewing: The method, as hereinbefore described in greater detail, begins with a level base material, for example, a broken-twill woven fabric, comprising textile warp and weft yarns, with rubber-elastic threads so interspersed with the yarns of one set that the material has a maximum, one-way elongation of from 110% to 120%. All of the yarns and the rubber threads are of substantially the same size (FIG. 4), so that the surface contour of the base fabric does not limit the choice of pattern to be embossed.

There is then provided an impregnated fluid in which the fabric, as received from the loom, that is to say, that the woven base fabric has not been subjected to any of the customary finishing steps, is immersed for a period of from 5 to 6 seconds at room temperature and atmospheric pressure and afterward dried. The impregnant fluid is preferably a latex (which may contain pigments or casein with a total solid content of from approximately 18.3% to 18.75%, the latex being for example, an acrylic polymer, or a polyvinyl acetate, and of a viscosity, for example, from 16 sec. to 23 sec. No. 4, Ford cup, that is, such that, under the above conditions of immersion, the individual textile yarns absorb the fluid (while the interstices of the material remains open to an extent such that when the impregnated material has been dried, its weight per yard, one-inch wide, will have increased an average of 0.00235 pound. After drying, the impregnated material may be embossed to resemble leather.

It is obvious that the multitudinous tiny exposed bights of textile yarn at each face of the base fabric and each of which is permeated with the cured thermoplastic impregnant and which are thus responsive to hot-press embossing, are capable, collectively, of providing a surface resembling the grain of natural leather. Since the embossed material which now forms this surface is part of the base fabric, it is inseparable from the latter and will not peel off during use.

However, if the desired simulated leather grain requires a deeper surface texture than that provided by the bights of yarn alone, the impregnated material, after drying, may be coated, for example, with the same fluid which was used as the impregnant, thereby adding from 2% to 3% to the weight of the dried impregnated material, and after the coating has dried, the material is embossed at a temperature of approximately 270° F. and at a pressure of from 900 to 1,000 pounds per square inch to resemble natural leather. The heat and pressure integrally bonds the coating substance with the material which impregnates the textile yarns so that the leather-simulating material cannot peel off from the base fabric.

This invention in all its phases results in an elastic material that can be handled in a shoe or garment factory in the same manner as ordinary elastic material and with little variation by methods normally adopted for the use of leather or nonelastic textiles.

I claim:

1. That method of preparing an elastically stretchable artificial leather acceptable as respects appearance and porosity as a substitute for actual leather in making the upper of a shoe, said method comprising as steps providing as a base fabric a woven, one-way stretch elastic web comprising conventional warp and weft yarns of textile material and wherein bare rubber threads are interspersed between the warp yarns according to any desired pattern, the rubber elastic threads being located at the midplane of the fabric and the average weight of the base fabric being from approximately 0.0514 to 0.0529 pound for a yard-long strip, one-inch wide, and its maximum elongation being from 110% to 120%, providing, as an impregnant, a latex of a thermoplastic synthetic resin selected from the group comprising acrylic and vinyl polymers to which solids have been added in an amount such that the total solids in the impregnant are from approximately 18.3% to 18.75%, of the total weight, the viscosity being from 16 to 23 sec. No. 4, Ford cup, immersing the base fabric while slack in said impregnating liquid at room temperature and pressure for a period of from 5 to 6 sec. whereby the textile yarns individually absorb impregnant, but without closing the interstices between the yarns, to the extent that the weight of the material, after drying, exceeds that of the unimpregnated base material by approximately 0.00235 pound in a yard-long strip, one-inch wide, drying the material and thereafter so embossing one side, at least, of the material at a temperature of approximately 250° F. and a pressure of from about 900 to 1,000 p.s.i., as to impart to said side the appearance of natural leather.

2. The method of preparing an elastically stretchable artificial leather according to claim 1 further characterized in that the textile yarns and rubber threads are all of approximately the same size; the impregnant liquid comprises an acrylonitrile-butadiene-copolymer; and, after embossing, the embossed surface is sprayed with a finishing lacquer.

3. The method of preparing an elastically stretchable artificial leather according to claim 1, and at least one set of the textile yarns of the base fabric are of cotton, further characterized in that after the impregnated material has been dried out, before it is embossed, there is applied to one surface of the dried material a uniform coating of the impregnant substance such as to add from 2% to 3% additional weight to the impregnated and dried material, advancing the coated material through a space heated to a temperature of approximately 200° F. at a rate of about 10 yards per minute, and then embossing the coated surface of the material.

4. Elastically stretchable material having such tensile strength, flexibility, porosity and surface appearance that it may be substituted for natural leather in the manufacture of footwear, said material comprising a base fabric having base rubber thread associated with textile yarns, the rubber elastic threads being located at the midplane of the fabric and the average weight of the base fabric being from approximately 0.0514 to 0.0529 pound for a yard-long strip, one-inch wide, and its maximum elongation being from 110% to 120%, and wherein each individual textile yarn is permeated with an impregnant comprising a cured polymer of a synthetic, thermoplastic resin selected from the group comprising acrylic and vinyl polymers, but which does not fill the interstices between the constituent yarns whereby the material is permeable to air and water, one side, at least, of the stretchable material being embossed to have a surface texture and appearance simulating natural leather and wherein portions of the textile yarns, each of which is permeated with the cured impregnant, collectively constitute the leather-simulating face of the material, and wherein the quantity of cured impregnant which permeates the constituent textile yarns is approximately 0.00235 pound in a yard-long, one-inch wide strip of the material.

5. Elastically stretchable material according to claim 4 further characterized in that a surface coating of the cured impregnant material which adds from 2% to 3% to the weight of the impregnated base fabric is adherent to the textile yarns at one side at least of the material, said surface coating resembling leather.

References Cited

UNITED STATES PATENTS

| | | | |
|---|---|---|---|
| 2,117,975 | 5/1938 | Moore | 139—421 |
| 2,149,750 | 3/1939 | Schwartz. | |
| 2,173,976 | 9/1939 | Moore | 139—421 |
| 2,177,439 | 10/1939 | Moore. | |
| 2,184,153 | 12/1939 | Schwartz | 161—76 XR |
| 2,290,072 | 7/1942 | Robb. | |
| 2,322,382 | 6/1943 | Moore | 139—421 XR |
| 3,034,927 | 5/1962 | Fairclough et al. | |
| 3,073,713 | 1/1963 | Brodeur. | |
| 3,083,134 | 3/1963 | Fairclough et al. | |
| 3,185,582 | 5/1965 | Alegre. | |

DAVID KLEIN, Primary Examiner

U.S. Cl. X.R.

139—421; 117—11, 135.5; 161—91